Jan. 3, 1956  H. F. PRASSE  2,729,524
PISTON RING
Filed June 15, 1951
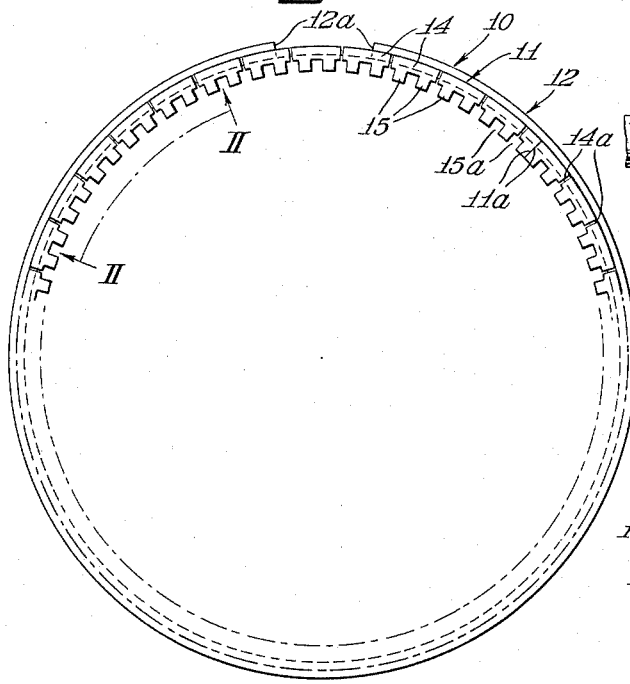
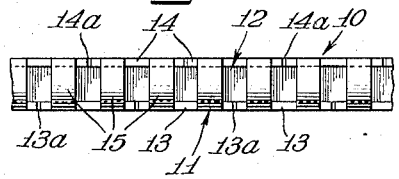
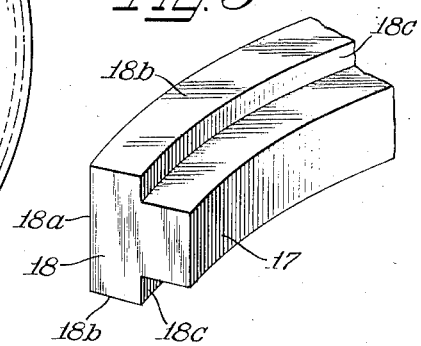
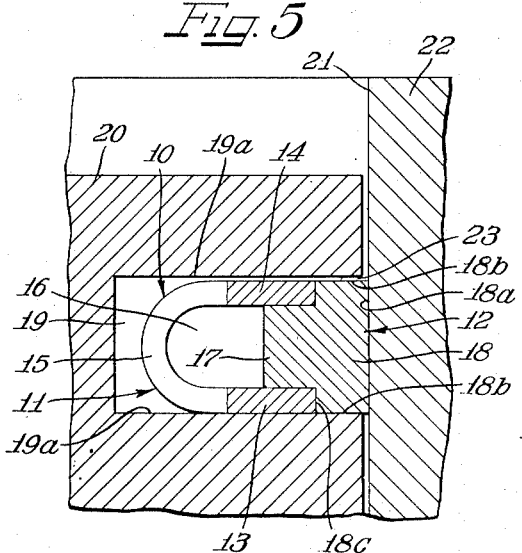
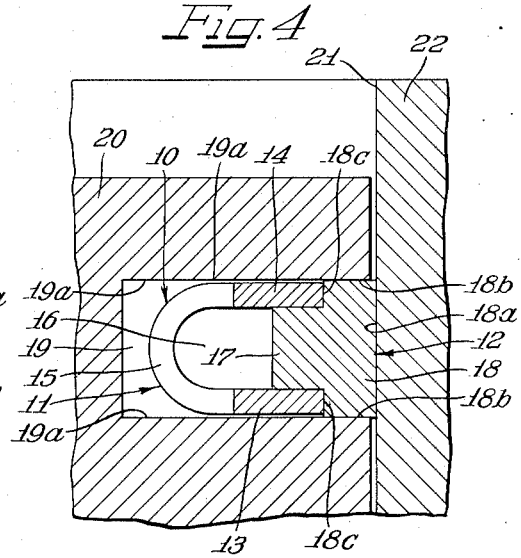
Inventor
Herbert F. Prasse
by Attys

United States Patent Office 2,729,524
Patented Jan. 3, 1956

2,729,524
PISTON RING

Herbert F. Prasse, Gates Mills, Ohio, assignor to Thompson Products, Inc., Cleveland, Ohio, a corporation of Ohio Application June 15, 1951, Serial No. 231,701

3 Claims. (Cl. 309—44)

This invention relates to a compression piston ring assembly which will follow irregularities in distorted or worn cylinder walls to maintain an effective seal while resisting the temperatures, compression loads, and stresses with at least the same efficiency as heretofore used rigid compression rings which were incapable of following the cylinder wall irregularities and thereby permitted excessive blow-by.

Specifically, this invention deals with a compression ring for the pistons of internal combustion engines wherein a spring hardened sheet metal flexible circumferentially expanding ring carries and backs up a relatively shallow solid metal ring formed of cast iron or the like rigid metal but being flexible due to the shallowness thereof. The solid metal ring is preferably of T-shaped cross section with the leg thereof lying within a channel of the sheet metal ring and with the head thereof overlying the sheet metal ring to provide a circumferential cylinder wall engaging face and piston ring groove end faces. The sheet metal ring is circumferentially compressed in operation so as to exert an expanding force on the solid metal ring. The top and bottom faces of the sheet metal ring are adapted to engage the piston ring groove in the event of wear of the end faces of the solid metal ring. Side sealing of the assembly is thereby maintained even in the event of excessive wear of the solid metal ring or the piston ring grooves. The T-head of the solid metal rings is relatively shallow in a radial direction so that the ring has considerable flexibility and is adapted to follow any irregularities in the cylinder wall under the influence of the radial load imparted thereon by the expansible sheet metal ring.

It is, then, an object of this invention to provide a compression ring assembly composed of a hardened spring metal backing ring and a softer solid metal compression ring adapted to follow the irregularities of the cylinder wall under the influence of an expanding force exerted thereon by the spring metal ring.

A further object of the invention is to provide a compression piston ring assembly composed of a hardened sheet metal circumferentially expansible backing ring and a flexible solid metal outer ring.

A still further object of the invention is to provide a compression ring assembly composed of a flexible circumferentially expansible backing ring defining a channel with an open outer face and a solid metal ring of T-shaped cross section having the leg thereof seated in the channel and the head thereof overlying the flexible ring to provide an outer circumferential face for engaging the cylinder wall and top and bottom end faces for engaging the ring groove of the piston.

Another object of the invention is to provide a compression ring assembly composed of an expansible sheet metal type of oil ring and a solid metal compression ring surrounding the oil ring and carried thereby but being thin enough in a radial direction so as to follow cylinder wall irregularities under the influence of the expansible load imparted thereon by the oil ring.

A further object of the invention is to provide a hardened spring steel backing ring of channel shape and a solid cast metal compression ring of T-shape having the leg of the T seated in the channel and the head of the T overlying the channel ring.

Other and further objects of the invention will be apparent to those skilled in the art from the following detailed description of the annexed sheet of drawings which, by way of a preferred example only, illustrates one embodiment of the invention.

On the drawings:

Figure 1 is a plan view of a compression piston ring assembly according to this invention.

Figure 2 is a fragmentary inside elevational view of the assembly of Figure 1 viewed along the line II—II of Figure 1.

Figure 3 is a fragmentary isometric view of the outer or compression ring of the assembly of Figures 1 and 2.

Figure 4 is an enlarged somewhat diagrammatic vertical cross-sectional view of a piston and cylinder assembly including a compression ring of this invention and illustrating the initial condition of the ring before wear.

Figure 5 is a view similar to Figure 4 but illustrating the condition of the ring after appreciable wear.

As shown on the drawings:

In Figures 1 and 2, the compression piston ring assembly 10 includes an inner spring-hardened sheet metal flexible circumferentially expanding piston ring 11 of the type normally used to control oil flow together with an outer solid cast metal ring 12 composed of metal normally used for compression rings. Both rings 11 and 12 are split, but, in operation, the ends 11a of the inner ring 11 are in abutted together relation, while the ends 12a of the outer ring 12 are separated to provide a gap that can be contracted. The inner ring 11 is circumferentially expansible and, when radially compressed, forms a loaded spring having an equal expanding force on the entire body of the outer ring. The expanding force or load is applied in a radial direction, and, since the ring 11 is very flexible, it can follow any irregularities in an assembly in which it is mounted.

The ring 11 is composed of axially spaced apart top and bottom flanges connected by circumferentially spaced web members. The bottom flange is composed of a plurality of arcuate crowns or segments 13 separated by radial gaps or slots 13a. The top flange is composed of similar arcuate crowns or segments 14 in staggered relation with the segments 13 and separated by radial slots or gaps 14a which, as best shown in Figure 2, are offset from the slots or gaps 13a, so that no two gaps are in axial alignment. The segments 13 and 14 are connected by U-shaped webs or legs 15 with each segment having two webs extending from the radial inner face thereof along substantially flat leg portions which are then arcuately curved to similar opposed legs connected with the opposed segments. While two webs 15 extend from each segment or crown, these two webs are connected at their opposite ends to separate segments or crowns so that the webs form the connections which hold the crowns or segments in radially aligned and axially spaced relation. As shown, spaces or gaps 15a are provided between the webs.

The ring 11 is composed of a spring-hardened tool steel, such as S. A. E. 1095, containing 0.95% carbon. The hardened spring steel ring, with its ends 11a abutted as shown in Figure 1, is compressively loaded by decreasing the sizes of the slots or gaps 13a and 14a between the ring segments and, when so loaded, the ring will be circumferentially expansible yet sufficiently flexible to follow all irregularities in a groove in which it is mounted or in a cylinder wall against which it acts. The ring 11, as best shown in Figures 4 and 5, defines a channel 16 open around its circumference.

As best shown in Figure 3, the compression ring 12 is of T-shaped cross section and has a radial extending leg 17 and an axially extending head 18. The leg 17 has a height sized to fit freely in the channel 16 of the ring 11. The head 18 has a height sufficient to span the outer open end of the ring 11 and provides an outer peripheral or circumferential face 18a of appreciable width for engaging the cylinder wall. The head 18 is relatively shallow in a radial direction, so that the ring 12 is quite flexible. The head has flat top and bottom faces 18b for engaging the ring groove in a piston receiving the assembly. Axial shoulders 18c are provided between the leg 17 and the head 18 for engagement by the flanges of the ring 11.

As shown in Figures 4 and 5, the ring assembly 10 fits freely in the fire ring or compression ring groove 19 of a piston 20 for acting on the cylinder wall or bore 21 of a cylinder block 22 in which the piston operates.

The ring groove 19 has flat side walls 19a receiving the end faces 18b of the ring 12 freely thereagainst as shown in Figure 4. The outer face 18a of the ring 12 is urged into sealing engagement with the cylinder wall 21, by the expanding action of the ring 11, which acts on the shoulders 18c. In a new assembly 10, the end faces 18b of the ring 12 preferably project a slight distance beyond the outer faces of the flange segments 13 and 14 of the backing up ring 11, so that these faces 18b will engage the side walls 19a of the ring groove. If desired, however, these faces 18b can be flush with the outer faces of the flange segments 13 and 14.

After extended use of the assembly 10 in a piston and cylinder combination, the end faces 18b of the ring 12 may be worn down, or the groove walls 19a engaged by these faces may be worn. The bottom wall 19a of the ring groove must carry the compression load and may wear more rapidly than the top wall. In any event, however, as soon as wear of either the end faces 18b of the ring 12 or the groove walls 19a progresses sufficiently, the flange segments 13 and 14 of the hard spring metal ring 11 will sealingly engage the ring groove. Thus, as shown in Figure 5, as wear progresses, the entire bottom of the assembly 10 engages the bottom wall 19a of the ring groove under compression loads to seal against blowby. Since the flange segments 13 are composed of hardened spring steel, further wear will be at a much slower rate. The provision of a gap 23 between the top of the assembly and the top groove wall 19a after excessive wear is unimportant, because the sealing is effected on the bottom groove wall and on the cylinder wall.

From the above descriptions it will therefore be understood that the compression piston ring assembly of this invention provides uniform unit wall pressure on the cylinder wall in any desired amount controlled by the compressive loading of the backing up ring, which loading is independent of piston ring groove depth as is clearly evident from Figures 4 and 5, wherein the ring 11 is not even bottomed in the ring groove. The assembly of this invention is especially useful in the lower compression ring grooves of pistons, but it is also suitable for use in the top fire ring groove by making the inner ring 11 from a suitable heat resisting alloy. The assembly is sufficiently flexible so that it will follow irregularities in the cylinder wall caused by distortion from non-uniform heat distribution, fastening stud stresses, wear, and the like.

It will be understood that modifications and variations may be effected without departing from the scope of the novel concepts of the present invention.

I claim as my invention:

1. A compression piston ring assembly comprising a flexible circumferentially expansible sheet metal ring defining a channel with an open outer face, a solid metal ring of shallow T-shaped cross section having the leg thereof seated in and partially filling the channel and the head thereof overlying the sheet metal ring to provide a circumferential, imperforate, cylinder wall engaging face and top and bottom ring groove engaging faces, and said solid metal ring having shoulders on opposite sides of the leg thereof engaged by the outer circumferential edges of the sheet metal ring to expand the solid metal ring.

2. A piston ring assembly which comprises a flexible circumferentially expansible channel ring, a shallow, flexible solid metal ring of T-shaped cross section having the leg seated in the channel and the head spanning the channel ring to provide an outer imperforate circumferential cylinder wall engaging face and piston ring groove engaging end faces.

3. A piston ring assembly which comprises an inner flexible circumferentially expansible sheet metal channel ring, a flexible solid metal ring having a greater dimension along the vertical axis thereof than along the radius thereof and forming a generally T-shaped cross-section, the leg of the T partially filling the channel of the inner ring and the head of the T spanning the inner ring and providing imperforate ring groove engaging end faces and an imperforate cylinder wall-engaging circumferential face.

References Cited in the file of this patent

UNITED STATES PATENTS

| | | |
|---|---|---|
| 2,052,077 | Bristow | Aug. 25, 1936 |
| 2,231,801 | Cords | Feb. 11, 1941 |
| 2,330,550 | Bowers | Sept. 28, 1943 |

FOREIGN PATENTS

| | | |
|---|---|---|
| 935,032 | France | June 8, 1948 |